(12) United States Patent
Furuzawa et al.

(10) Patent No.: US 7,292,432 B2
(45) Date of Patent: Nov. 6, 2007

(54) SOLID ELECTROLYTIC CAPACITOR AND MANUFACTURING METHOD THEREFOR

(75) Inventors: Atsushi Furuzawa, Osaka (JP); Yoshikazu Hirata, Osaka (JP); Kohei Goto, Osaka (JP); Mitsuru Shirasaka, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 79 days.

(21) Appl. No.: 11/354,069

(22) Filed: Feb. 15, 2006

(65) Prior Publication Data

US 2006/0181836 A1  Aug. 17, 2006

(30) Foreign Application Priority Data

Feb. 17, 2005 (JP) ............................. 2005-040724

(51) Int. Cl.
*H01G 9/00* (2006.01)

(52) U.S. Cl. ...................... 361/523; 361/525; 361/528; 361/529; 361/534; 361/516; 29/25.01; 29/25.03

(58) Field of Classification Search ................ 361/523, 361/525, 528–529, 530–534, 540, 508–516; 29/25.01, 25.03
See application file for complete search history.

(56) References Cited

U.S. PATENT DOCUMENTS 5,454,147 A * 10/1995 Kobayashi et al. ........ 29/25.03
6,310,765 B1 * 10/2001 Tanahashi et al. .......... 361/516
6,449,140 B1 *  9/2002 Sakai et al. ................. 361/532
6,462,936 B1 * 10/2002 Fujimoto et al. ........... 361/525
6,706,078 B2 *  3/2004 Nitoh et al. ................ 29/25.03
6,728,097 B2 *  4/2004 Wada et al. ................. 361/533
6,771,488 B2 *  8/2004 Takagi et al. ............... 361/523
6,816,358 B2 * 11/2004 Kida et al. .................. 361/540
6,853,540 B2 *  2/2005 Kudoh et al. ............... 361/523
7,221,555 B2 *  5/2007 Goldberger ................. 361/525

FOREIGN PATENT DOCUMENTS

JP         2005-45235         2/2005

* cited by examiner

*Primary Examiner*—Nguyen T. Ha
(74) *Attorney, Agent, or Firm*—Westerman, Hattori, Daniels & Adrian, LLP.

(57) ABSTRACT

A solid electrolytic capacitor of the present invention includes a capacitor element having an anode element, an anode lead member projecting from the anode element, a dielectric coating formed on a surface of the anode element and a surface of the anode lead member near the anode element, a solid electrolyte layer formed on the dielectric coating, and a cathode lead layer formed on the solid electrolyte layer; and an insulating enclosure member for coating the outer periphery of the capacitor element. End faces of the dielectric coating and the solid electrolyte layer formed on the anode lead member are formed approximately flush with each other. The end faces of the dielectric coating and the solid electrolyte layer are covered with an insulating layer made of a thermoplastic insulating material.

17 Claims, 9 Drawing Sheets

SOLID ELECTROLYTIC CAPACITOR AND MANUFACTURING METHOD THEREFOR

The priority application Number 2005-040724 upon which this patent application is based is hereby incorporated by reference.

BACKGROUND OF THE INVENTION

1. Field of the Invention

The present invention relates to a solid electrolytic capacitor in which a dielectric coating and a solid electrolyte layer are sequentially formed on a surface of an anode element, and to a manufacturing method therefor.

2. Description of Related Art

Solid electrolytic capacitors are small and large-capacity in addition to being excellent in high-frequency characteristics, and therefore widely used in high-frequency circuits of various electronic devices such as personal computers and imaging devices.

FIG. 14 shows one example of a most typical solid electrolytic capacitor. This solid electrolytic capacitor 1 includes a capacitor element 2 having a function as a capacitor. The capacitor element 2 is formed with a block-like anode element 3 serving as a base. The anode element 3 is a sintered body of a valve-action metal such as tantalum, niobium, titanium or aluminum. A rod-like anode lead member 4 projects from an end face of the anode element 3. The anode lead member 4 is made of a valve-action metal of tantalum.

A dielectric coating 5 is formed on a surface of the anode element 3 and a surface of the anode lead member 4 near the anode element 3. The dielectric coating 5 is formed by oxidizing the surfaces of the anode element 3 and the anode lead member 4 with an anodic oxidation method, for example. A solid electrolyte layer 7 is formed on the dielectric coating 5. The solid electrolyte layer 7 is made of a conductive inorganic material such as manganese dioxide, or a conductive organic material such as TCNQ complex salt and a conductive polymer. A cathode lead layer is formed on the solid electrolyte layer 7. The cathode lead layer includes a carbon layer 8 and a silver layer 9, for example. A plate-like anode terminal 10 is connected to the anode lead member 4, while a plate-like cathode terminal 11 is connected to the cathode lead layer. The capacitor element 2 is coated with an enclosure member 12. The enclosure member 12 is generally in the form of a rectangular parallelepiped. The enclosure member 12 is made of epoxy resin, for example. The anode terminal 10 and the cathode terminal 11 are drawn out from the enclosure member 12 in opposite directions, and bent downward. The leading ends of these terminals 10, 11 are arranged along the lower surface of the enclosure member 12, and used for soldering the solid electrolytic capacitor to a mounting board.

In a manufacturing method for the solid electrolytic capacitor 1 as described above, the solid electrolyte layer 7 is formed by a chemical polymerization or an electrolytic polymerization method when a conductive polymer such as polypyrrole is used for the solid electrolyte layer 7.

In the chemical polymerization method, the solid electrolyte layer 7 is formed by oxidation-polymerizing a monomer using an oxidizing agent. Stated more specifically, the dielectric coating 5 is formed on the surfaces of the anode element 3 and the anode lead member 4, and thereafter the oxidizing agent is attached on the dielectric coating 5. Then, the anode element 3 and the anode lead member 4 having the oxidizing agent attached thereto are dipped in a solution having the monomer dissolved therein, or left in the monomer atmosphere. In this way, the monomer is polymerized on the dielectric coating 5 to form the solid electrolyte layer 7.

On the other hand, in the electrolytic polymerization method, the dielectric coating 5 is formed on the surfaces of the anode element 3 and the anode lead member 4, and then a precoat layer 7a made of a solid electrolyte is formed on the dielectric coating 5 using the chemical polymerization method as described above. Then, the anode element 3 and the anode lead member 4 having the precoat layer 7a formed thereon are dipped in a solution having a monomer dissolved therein. A tank with the solution therein is provided with an electrode and an electrode plate. With the electrode contacting the precoat layer 7a, a voltage is applied with the electrode serving as a positive electrode and the electrode plate as a negative electrode. In this way, the monomer is oxidation-polymerized to form a conductive polymer layer 7b covering the precoat layer 7a.

There has been proposed a manufacturing method as described below for a solid electrolytic capacitor using a conductive polymer such as polypyrrole, polythiophene, polyaniline, etc. as a solid electrolyte layer 7 (JP 2005-045235 A). In this manufacturing method, as shown in FIG. 16, a dielectric coating 5 is formed on a surface of an anode element 3 provided with an anode lead member 4 projecting therefrom, and on a surface of the anode lead member 4 at the side of the anode element 3. Then, a precoat layer 7a is formed on the dielectric coating 5 using a chemical polymerization method. Thereafter, a process is performed for partially removing the dielectric coating 5 and the precoat layer 7a on the anode lead member 4 to expose the surface of the anode lead member 4. In the process, a laser beam, for example, is radiated to a part from which the dielectric coating 5 and the precoat layer 7a are to be removed.

Next, a conductive polymer layer 7b is formed on the precoat layer 7a. First, the anode element 3 and the anode lead member 4 are dipped in a solution having a monomer to be polymerized to be a conductive polymer dissolved therein. At this time, the exposed surface of the anode lead member 4 is positioned on the surface of the solution. Then, a voltage is applied between an electrode plate in the solution and the anode lead member 4. In this way, the conductive polymer layer 7b is formed on the exposed surface of the anode lead member 4 and on the precoat layer 7a. The conductive polymer layer 7b acts as a solid electrolyte layer 7 together with the precoat layer 7a.

Thereafter, as shown in FIG. 17, a laser beam 31 is radiated to the conductive polymer layer 7b formed on the surface of the anode lead member 4 to remove the conductive polymer layer 7b formed on the surface of the anode lead member 4 and insulate the anode lead member 4 from the solid electrolyte layer 7. Thereafter, an injection molding process for forming an enclosure member 12 and an aging process are further performed. With such a manufacturing method, a manufacturing process can be more efficient because removal of burrs of the conductive polymer layer 7b generated by the electrolytic polymerization process and removal of an unnecessary part of the dielectric coating 5 and the solid electrolyte layer 7 on the anode lead member 4 can be performed simultaneously.

FIG. 15 shows a solid electrolytic capacitor manufactured by the above-described manufacturing method. In such a capacitor, end faces of a dielectric coating 5 and a solid electrolyte layer 7 formed on an anode lead member 4 are formed approximately flush with each other. On the other hand, it is difficult to form the end faces of the dielectric coating 5 and the solid electrolyte layer 7 on the anode lead member 4 approximately flush with each other in a conventional method in which removal of burrs of a conductive polymer layer 7b is mechanically performed using a file or grinder. Accordingly, as shown in FIG. 14, the end face of the dielectric coating 5 is located closer to the leading end of the anode lead member 4 than the end face of the solid electrolyte layer 7. The solid electrolytic capacitor shown in FIG. 15 can be made smaller than the conventional solid electrolytic capacitor shown in FIG. 14 because an anode terminal 10 can be connected to the anode lead member 4 near the anode element 3.

However, removal of burrs of the conductive polymer layer 7b using the laser beam 31 as shown in FIG. 17 results in a low strength near the end faces of the dielectric coating 5 and the solid electrolyte layer 7 because of heat of the laser beam 31. As shown in FIG. 15, a capacitor element 2 has a periphery thereof covered with an enclosure member 12 made of epoxy resin or the like. When the capacitor element 2 is heated during the injection molding process or aging process, a slight gap can occur between the end faces of the dielectric coating 5 and the solid electrolyte layer 7 and the enclosure member 12 because of a difference between a coefficient of thermal expansion of the enclosure member 12 and a coefficient of thermal expansion of the dielectric coating 5 and the solid electrolyte layer 7.

If a gap exists between the end faces of the dielectric coating 5 and the solid electrolyte layer 7 and the enclosure member 12, the dielectric coating 5 and the solid electrolyte layer 7 with a low strength generate cracks due to external stress or time degradation, causing a problem of an increase of a leak current or short circuit occurrence.

When the capacitor element 2 is heated during the injection molding process or aging process, a slight gap can occur also between the anode lead member 4 and the enclosure member 12 because of a difference between a coefficient of thermal expansion of the enclosure member 12 and a coefficient of thermal expansion of the anode lead member 4. If there is a gap between the enclosure member 12 and the anode lead member 4, then, under high humidity environment, external moisture is likely to enter an inside of the enclosure member 12 through the gap from an interface between the anode terminal 10 and the enclosure member 12. The moisture acquired on the end faces of the dielectric coating 5 and the solid electrolyte layer 7 causes a problem of an increase of a leak current or occurrence of a short circuit. Even if the end faces of the dielectric coating 5 and the solid electrolyte layer 7 on the anode lead member 4 are formed approximately flush with each other as shown in FIG. 15 without the laser beam, there is a problem of a leak current being easily increased because a distance between the anode lead member 4 and the solid electrolyte layer 7 becomes much shorter than that of the conventional solid electrolytic capacitor 1 shown in FIG. 14.

SUMMARY OF THE INVENTION

An object of the present invention is to provide a solid electrolytic capacitor excellent in reliability and a manufacturing method therefor, in which an increase of a leak current and occurrence of a short circuit are prevented.

A solid electrolytic capacitor of the present invention comprises a capacitor element 2 having an anode element 3, an anode lead member 4 projecting from one end face of the anode element 3, a dielectric coating 5 formed in one piece on a surface of the anode element 3 and a surface of the anode lead member 4 near the anode element 3, a solid electrolyte layer 7 formed on the dielectric coating 5, and a cathode lead layer formed on the solid electrolyte layer 7 formed on the anode element 3; an anode terminal 10 connected to the anode lead member 4; a cathode terminal 11 connected to the cathode lead layer; and an insulating enclosure member 12 for coating the outer periphery of the capacitor element 2, wherein end faces of the dielectric coating 5 and the solid electrolyte layer 7 formed on the anode lead member 4 are formed approximately flush with each other, and covered with an insulating layer 50 made of a thermoplastic insulating material.

In the above-described solid electrolytic capacitor of the present invention, when heat is applied thereto during an injection molding process or aging process, for example, the insulating layer 50 turns soft because of the heat, and therefore is easily deformed along the end faces of the solid electrolyte layer 7 and the dielectric coating 5. Therefore, a gap is unlikely to occur between the end faces of the solid electrolyte layer 7 and the dielectric coating 5 and the insulating layer 50. This can suppress an increase of a leak current and occurrence of a short circuit.

Specifically, a material of the enclosure member 12 is a thermosetting resin, and the insulating layer 50 is made of a fluorine series resin.

Another solid electrolytic capacitor of the present invention comprises a capacitor element 2 having an anode element 3, an anode lead member 4 projecting from one end face of the anode element 3, a dielectric coating 5 formed in one piece on a surface of the anode element 3 and a surface of the anode lead member 4 near the anode element 3, a solid electrolyte layer 7 formed on the dielectric coating 5, and a cathode lead layer formed on the solid electrolyte layer 7 formed on the anode element 3; an anode terminal 10 connected to the anode lead member 4; a cathode terminal 11 connected to the cathode lead layer; and an insulating enclosure member 12 for coating the outer periphery of the capacitor element 2, wherein end faces of the dielectric coating 5 and the solid electrolyte layer 7 formed on the anode lead member 4 are formed approximately flush with each other, and covered with an insulating layer 50 made of an insulating material with a coefficient of thermal expansion smaller than that of the enclosure member 12.

In the above-described solid electrolytic capacitor of the present invention, a difference between a coefficient of thermal expansion of the solid electrolyte layer 7 and the dielectric coating 5 and a coefficient of thermal expansion of the insulating layer 50 is smaller than a difference between the coefficient of thermal expansion of the solid electrolyte layer 7 and the dielectric coating 5 and a coefficient of thermal expansion of the enclosure member 12. Therefore, when heat is applied during an injection molding process or aging process, for example, there is almost no gap caused by a difference between coefficients of thermal expansion between the end faces of the solid electrolyte layer 7 and the dielectric coating 5 and the insulating layer 50 compared with the case where the end faces of the solid electrolyte layer 7 and the dielectric coating 5 are directly covered with the enclosure member 12. This can suppress an increase of a leak current and occurrence of a short circuit.

Specifically, the insulating layer 50 is made of a thermoplastic material. Further specifically, the enclosure member 12 is made of a thermosetting material, and the insulating layer 50 is made of a fluorine series resin.

A manufacturing method for a solid electrolytic capacitor of the present invention comprises a first step of forming a one-piece dielectric coating 5 on a surface of an anode element 3 and a surface of an anode lead member 4 projecting from the anode element 3, a second step of forming a precoat layer 7a on the dielectric coating 5, a third step of partially removing the dielectric coating 5 and the precoat layer 7a on the anode lead member 4 to expose the surface of the anode lead member 4 at the side of the anode element 3, while keeping the dielectric coating 5 and the precoat layer 7a on the anode lead member 4 near the anode element 3, a fourth step of dipping the anode element 3 and the anode lead member 4 in a solution having a monomer dissolved therein, and, with the exposed surface of the anode lead member 4 positioned on the surface of the solution, forming a conductive polymer layer 7b on the precoat layer 7a using an electrolytic polymerization method to form a solid electrolyte layer 7 including the precoat layer 7a and the conductive polymer layer 7b, a fifth step of removing a burr 70 of the conductive polymer layer 7b generated on the exposed surface of the anode lead member 4, a sixth step of forming a cathode lead layer on the conductive polymer layer 7b to form a capacitor element 2, and a seventh step of coating the outer periphery of the capacitor element 2 with an enclosure member by injection molding, wherein after the fifth step and before the seventh step, at least end faces of the dielectric coating 5 and the solid electrolyte layer 7 on the anode lead member 4 are covered with an insulating layer 50 made of a thermoplastic insulating material.

With the above-described manufacturing method for a solid electrolytic capacitor of the present invention, in the seventh step of performing injection molding, the end faces of the solid electrolyte layer 7 and the dielectric coating 5 are covered with the insulating layer 50, and therefore the solid electrolyte layer 7 and the dielectric coating 5 can be protected from injection pressure.

Specifically, in the fifth step, the burr 70 of the conductive polymer layer 7b is removed using a laser beam. This allows the burr 70 to be easily removed, and can improve productivity.

Another manufacturing method for a solid electrolytic capacitor of the present invention comprises a first step of forming a one-piece dielectric coating 5 on a surface of an anode element 3 and a surface of an anode lead member 4 projecting from the anode element 3, a second step of forming a precoat layer 7a on the dielectric coating 5, a third step of partially removing the dielectric coating 5 and the precoat layer 7a on the anode lead member 4 to expose the surface of the anode lead member 4 at the side of the anode element 3, while keeping the dielectric coating 5 and the precoat layer 7a on the anode lead member 4 near the anode element 3, and keeping the dielectric coating 5 at the side of the leading end of the anode lead member 4, a fourth step of dipping the anode element 3 and the anode lead member 4 in a solution having a monomer dissolved therein, and, with the dielectric coating 5 formed at the side of the leading end of the anode lead member 4 positioned on the surface of the solution, forming a conductive polymer layer 7b on the precoat layer 7a using an electrolytic polymerization method to form a solid electrolyte layer 7 including the precoat layer 7a and the conductive polymer layer 7b, a fifth step of removing the conductive polymer layer 7b formed on the exposed surface of the anode lead member 4, a sixth step of forming a cathode lead layer on the conductive polymer layer 7b to form a capacitor element 2, and a seventh step of coating the outer periphery of the capacitor element with an enclosure member 12 by injection molding, wherein after the fifth step and before the seventh step, at least end faces of the dielectric coating 5 and the solid electrolyte layer 7 on the anode lead member 4 are covered with an insulating layer 50 made of a thermoplastic insulating material.

With the above-described manufacturing method for a solid electrolytic capacitor of the present invention, in the seventh step of performing injection molding, the end faces of the solid electrolyte layer 7 and the dielectric coating 5 are covered with the insulating layer 50, and therefore the solid electrolyte layer 7 and the dielectric coating 5 can be protected from injection pressure. Therefore, the solid electrolyte layer 7 and the dielectric coating 5 are unlikely to be damaged during injection molding, so that an increase of a leak current due to cracks of the solid electrolyte layer 7 and the dielectric coating 5 can be suppressed.

Specifically, in the fifth step, the conductive polymer layer 7b formed on the exposed surface of the anode lead member 4 is removed using a laser beam. This allows the conductive polymer layer 7b formed on the exposed surface of the anode lead member 4 to be easily removed, and can improve productivity. Further specifically, in the third step, only the dielectric coating 5 formed on the surface of the anode lead member 4 is left at the side of the leading end of the anode lead member 4.

A manufacturing method for another solid electrolytic capacitor of the present invention comprises a first step of forming a one-piece dielectric coating 5 on a surface of an anode element 3 and a surface of an anode lead member 4 projecting from the anode element 3, a second step of forming a precoat layer 7a on the dielectric coating 5, a third step of partially removing the dielectric coating 5 and the precoat layer 7a on the anode lead member 4 to expose the surface of the anode lead member 4 at the side of the anode element 3, while keeping the dielectric coating 5 and the precoat layer 7a on the anode lead member 4 near the anode element 3, a fourth step of dipping the anode element 3 and the anode lead member 4 in a solution having a monomer dissolved therein, and, with the exposed surface of the anode lead member 4 positioned on the surface of the solution, forming a conductive polymer layer 7b on the precoat layer 7a using an electrolytic polymerization method to form a solid electrolyte layer 7 including the precoat layer 7a and the conductive polymer layer 7b, a fifth step of removing a burr 70 of the conductive polymer layer 7b generated on the exposed surface of the anode lead member 4, a sixth step of forming a cathode lead layer on the conductive polymer layer 7b to form a capacitor element, and a seventh step of coating the outer periphery of the capacitor element with an enclosure member 12 by injection molding, wherein after the fifth step and before the seventh step, at least end faces of the dielectric coating 5 and the solid electrolyte layer 7 on the anode lead member 4 are covered with an insulating layer 50 made of an insulating material having a coefficient of thermal expansion smaller than a coefficient of thermal expansion of the enclosure member 12.

With the above-described manufacturing method for a solid electrolytic capacitor of the present invention, in the seventh step of performing injection molding, the end faces of the solid electrolyte layer 7 and the dielectric coating 5 are covered with the insulating layer 50, and therefore the solid electrolyte layer 7 and the dielectric coating 5 can be protected from injection pressure.

Specifically, in the fifth step, the burr 70 of the conductive polymer layer 7b is removed using a laser beam. This allows the burr 70 to be easily removed, and can improve productivity.

Another manufacturing method for another solid electrolytic capacitor of the present invention comprises a first step of forming a one-piece dielectric coating 5 on a surface of an anode element 3 and a surface of an anode lead member 4 projecting from the anode element 3, a second step of forming a precoat layer 7a on the dielectric coating 5, a third step of partially removing the dielectric coating 5 and the precoat layer 7a on the anode lead member 4 to expose the surface of the anode lead member 4 at the side of the anode element 3, while keeping the dielectric coating 5 and the precoat layer 7a on the anode lead member 4 near the anode element 3, and keeping the dielectric coating 5 at the side of the leading end of the anode lead member 4, a fourth step of dipping the anode element 3 and the anode lead member 4 in a solution having a monomer dissolved therein, and, with the dielectric coating 5 formed at the side of the leading end of the anode lead member 4 positioned on the surface of the solution, forming a conductive polymer layer 7b on the precoat layer 7a using an electrolytic polymerization method to form a solid electrolyte layer 7 including the precoat layer 7a and the conductive polymer layer 7b, a fifth step of removing the conductive polymer layer 7b formed on the exposed surface of the anode lead member 4, a sixth step of forming a cathode lead layer on the conductive polymer layer 7b to form a capacitor element 2, and a seventh step of coating the outer periphery of the capacitor element with an enclosure member 12 by injection molding, wherein after the fifth step and before the seventh step, at least end faces of the dielectric coating 5 and the solid electrolyte layer 7 on the anode lead member 4 are covered with an insulating layer 50 made of an insulating material having a coefficient of thermal expansion smaller than a coefficient of thermal expansion of the enclosure member 12.

With the above-described manufacturing method for a solid electrolytic capacitor of the present invention, in the seventh step of performing injection molding, the end faces of the solid electrolyte layer 7 and the dielectric coating 5 are covered with the insulating layer, and therefore the solid electrolyte layer 7 and the dielectric coating 5 can be protected from injection pressure.

Specifically, in the fifth step, the conductive polymer layer 7b formed on the exposed surface of the anode lead member 4 is removed using a laser beam. This allows the conductive polymer layer 7b formed on the exposed part of the anode lead member 4 to be easily removed. Further specifically, in the third step, only the dielectric coating 5 formed on the surface of the anode lead member 4 is left at the side of the leading end of the anode lead member 4.

DETAILED DESCRIPTION OF THE INVENTION

An embodiment of the present invention will be specifically described below with reference to the drawings.

Figure 1:
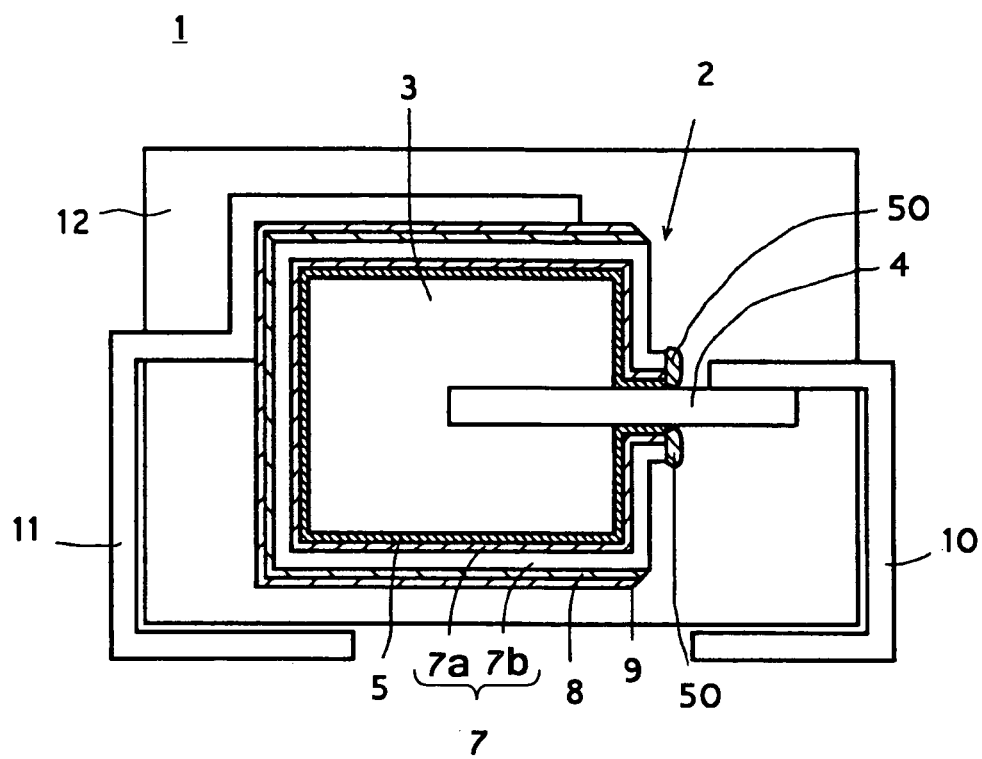
FIG. 1 is a cross-sectional view of a solid electrolytic capacitor of the present invention.

One embodiment of the present invention is described with reference to the drawings. FIG. 1 is a cross-sectional view of a solid electrolytic capacitor 1 of the present invention. An anode element 3 is a sintered body of a valve-action metal of tantalum, and formed in the form of a block. A rod-like anode lead member 4 projects from a top face of the anode element 3. The anode lead member 4 projects from an approximate center of the top face of the anode element 3 approximately perpendicularly to the top face. The anode lead member 4 is made of a valve-action metal of tantalum. A valve-action metal means here a metal for forming an extremely dense and durable dielectric coating 5 by an electrolytic oxidation treatment, and may be niobium, aluminum, titanium, etc. besides tantalum.

A dielectric coating 5 is formed in one piece on a surface of the anode element 3 and a surface of the anode lead member 4 near the anode element 3. A solid electrolyte layer 7 is formed on the dielectric coating 5. Conductive materials usable for the solid electrolyte layer 7 may include, for example, a conductive inorganic material of manganese dioxide and conductive organic materials of TCNQ complex salt and conductive polymers of polypyrrole series, polythiophene series, polyaniline series, etc. End faces of the dielectric coating 5 and the solid electrolyte layer 7 on the anode lead member 4 are formed approximately flush with each other, and covered with an insulating layer 50.

The insulating layer 50 is made of an insulating material having thermoplasticity and/or a coefficient of thermal expansion smaller than that of an enclosure member 12 described below. Thermoplasticity is a quality of repeatedly softening when heated and hardening when cooled. Specific examples of such materials may include fluorine series resins such as fluoroelastomer and a silicon varnish. Similar fluorine series resins that have a coefficient of thermal expansion greater than that of the enclosure member 12 and that are nonthermoplastic would not be used as a material constituting the insulating layer 50. If epoxy resin is used as a material constituting the enclosure member 12, examples of an insulating material with a coefficient of thermal expansion smaller than that of the enclosure member 12 may include, but not limited to, epoxy resin with a coefficient of thermal expansion decreased by an additive agent, urethane resin, silicon resin, etc. A coefficient of thermal expansion of a material constituting the insulating layer 50 is smaller than a coefficient of thermal expansion of the enclosure member 12, so that a difference is smaller between coefficients of thermal expansion of the dielectric coating 5 and solid electrolyte layer 7 and the insulating layer 50. The insulating layer 50 may cover at least the end faces of the dielectric coating 5 and the solid electrolyte layer 7. The entire periphery of the capacitor element 2 may be covered with the insulating layer 50.

A carbon layer 8 and a silver layer 9 are sequentially formed as a cathode lead layer on the solid electrolyte layer 7 formed on the anode element 3. The cathode lead layer may include any material, not particularly limited to the carbon layer 8 and the silver layer 9. An anode terminal 10 is attached by resistance welding to the leading end of the anode lead member 4 projecting from the anode element 3. The cathode lead layer is attached to a cathode terminal 11 with a conductive adhesive. The capacitor element 2 is sealed with the enclosure member 12 made of a thermosetting resin such as epoxy resin. The enclosure member 12 is generally in the form of a rectangular parallelepiped. A part of the anode terminal 10 and a part of the cathode terminal 11 are exposed from the enclosure member 12. The exposed parts of the anode terminal 10 and the cathode terminal 11 are bent along peripheral surfaces of the enclosure member 12.

Two Examples will be described below for manufacturing the above solid electrolytic capacitor of the present invention.

EXAMPLE 1

Figure 2:
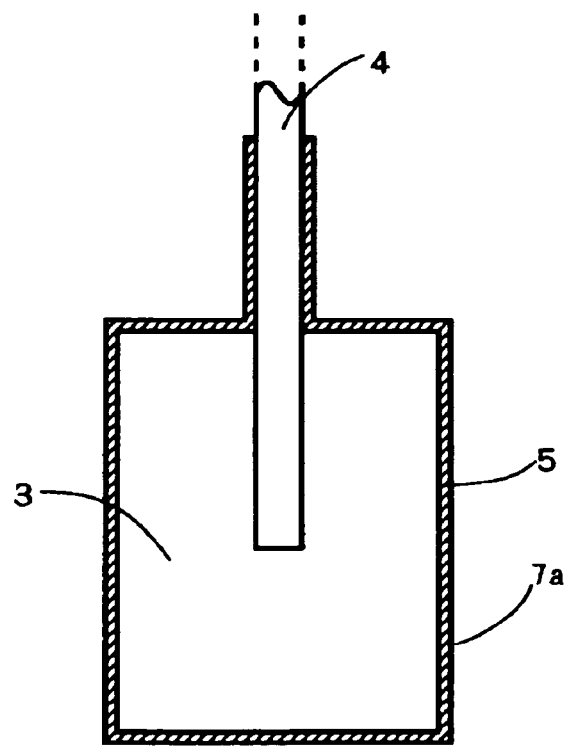
FIG. 2 is a cross-sectional view showing an anodizing process for manufacturing the solid electrolytic capacitor of the present invention.
Figure 3:
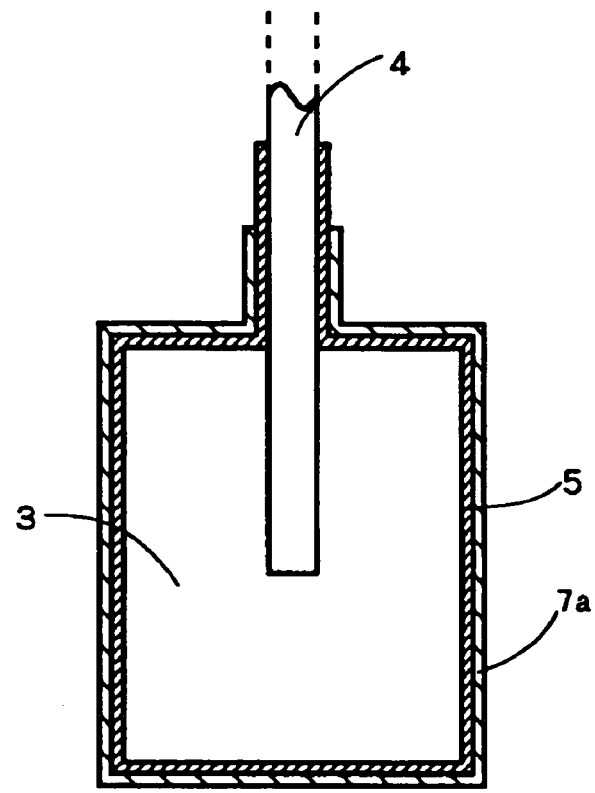
FIG. 3 is a cross-sectional view showing a chemical polymerization process for manufacturing the solid electrolytic capacitor of the present invention.

An anode element 3 provided with an anode lead member 4 projecting therefrom is first prepared. The anode lead member 4 is made by cutting a tantalum wire into a predetermined length. Then, as shown in FIG. 2, an anodizing process is performed for forming a dielectric coating 5 in one piece on surfaces of the anode element 3 and the anode lead member 4. In the anodizing process, the anode element 3 and the anode lead member 4 at the side of the anode element 3 are dipped in phosphoric acid aqueous solution, and thereafter a voltage is applied to the anode element 3 and the anode lead member 4. In this way, the dielectric coating 5 is formed on the surface of the anode element 3 and the surface of the anode lead member 4 at the side of the anode element 3. Next, as shown in FIG. 3, a chemical polymerization process is performed for forming a precoat layer 7a on the dielectric coating 5. Polypyrrole, for example, is used for the precoat layer 7a. In the chemical polymerization process, an oxidizing agent is attached on the dielectric coating 5 on the surfaces of the anode element 3 and the anode lead member 4, and thereafter the anode element 3 and the anode lead member 4 are dipped in a solution having a monomer dissolved therein, or left in monomer atmosphere. In this way, pyrrole is polymerized on the dielectric coating 5 to form the precoat layer 7a. On the anode lead member 4, the precoat layer 7a is formed only at the side of the anode element 3, and the precoat layer 7a is not formed on the dielectric coating 5 formed at the side of the leading end of the anode lead member 4. Therefore, the precoat layer 7a does not contact the anode lead member 4.

Figure 4:
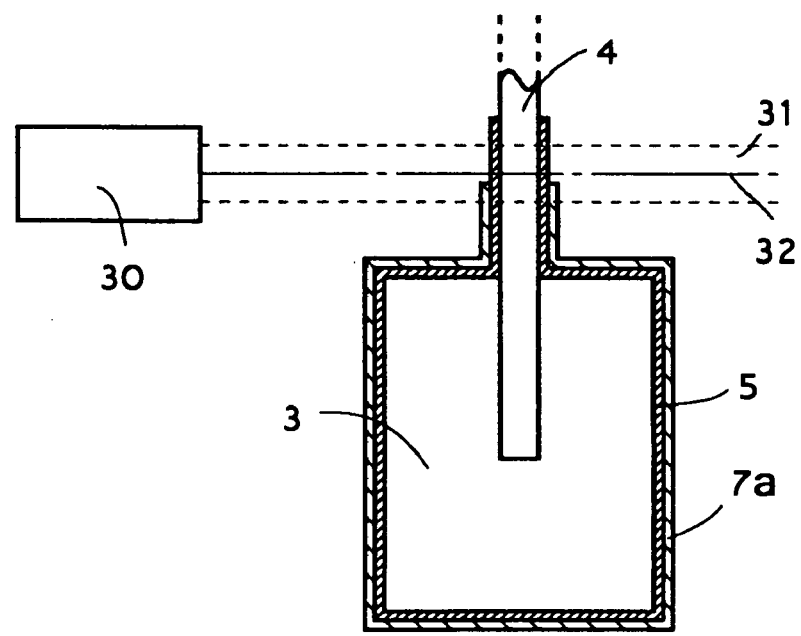
FIG. 4 is a cross-sectional view showing a first removal process for manufacturing the solid electrolytic capacitor of the present invention.
Figure 5:
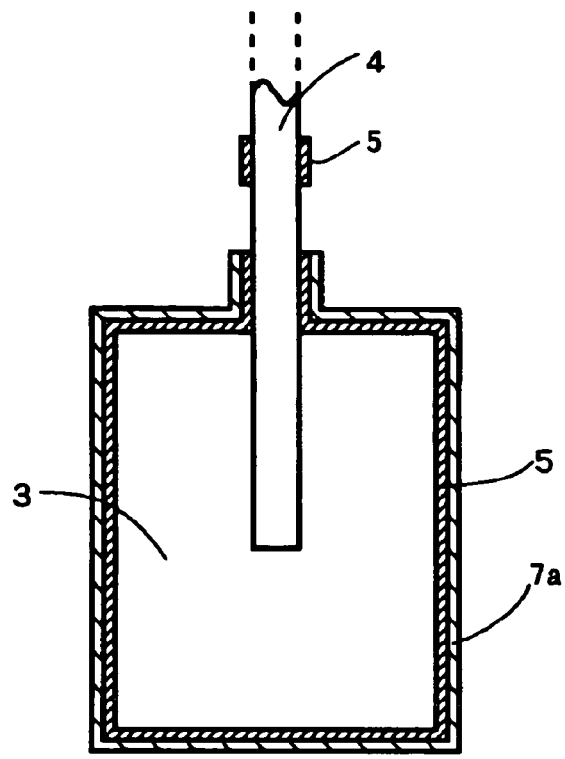
FIG. 5 is a cross-sectional view showing the first removal process for manufacturing the solid electrolytic capacitor of the present invention.

After the precoat layer 7a is formed, a first removal process is performed for partially removing the dielectric coating 5 and the precoat layer 7a formed on the anode lead member 4 to expose the surface of the anode lead member 4. In the first removal process, a part from which the dielectric coating 5 and the precoat layer 7a are to be removed is a boundary part between the surface having the precoat layer 7a formed on the dielectric coating 5 and the surface having only the dielectric coating 5 formed on the anode lead member 4. Therefore, as shown in FIG. 5, the surface of the anode lead member 4 is exposed annularly from between the part having the precoat layer 7a formed on the dielectric coating 5 and the part having only the dielectric coating 5 formed thereon. In the first removal process, as shown in FIG. 4, a laser beam 31 is radiated from a laser light source 30 to the part from which the dielectric coating 5 and the precoat layer 7a are to be removed. Preferably, the laser beam 31 is radiated from a plurality of directions. For example, in addition to one laser light source 30, another laser light source (not shown) is arranged such that the anode lead member 4 is positioned between them, and after the laser beam 31 is radiated from the one laser light source 30, a laser beam is radiated from the other laser light source. Alternatively, one laser light source 30 may be moved relative to the anode lead member 4.

Figure 6:
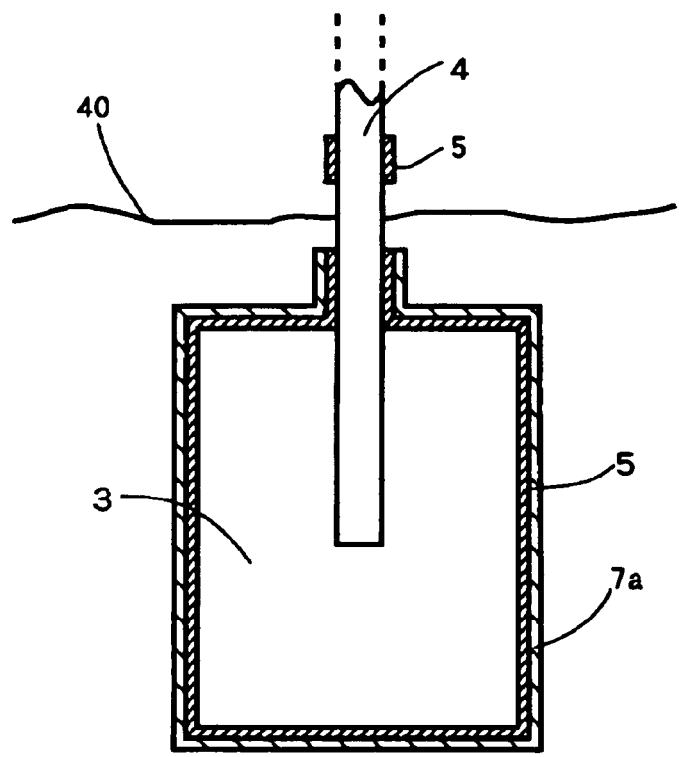
FIG. 6 is a cross-sectional view showing an electrolytic polymerization process for manufacturing the solid electrolytic capacitor of the present invention.

Next, an electrolytic polymerization process is performed for forming a conductive polymer layer 7b on the precoat layer 7a. Polypyrrole, polyaniline, polythiophene or a derivative of these is used for a material of the conductive polymer layer 7b. The conductive polymer layer 7b and the precoat layer 7a act as a solid electrolyte layer 7. In the electrolytic polymerization process, as shown in FIG. 6, the anode element 3 and the anode lead member 4 are dipped in a solution having a monomer to be polymerized to be the conductive polymer layer 7b dissolved therein. At this time, the exposed surface of the anode lead member 4 is positioned on the surface 40 of the solution. After the anode element 3 and the anode lead member 4 are dipped in the solution, a voltage is applied between an electrode (not shown) dipped in the solution and the anode lead member 4 with the anode lead member 4 serving as a positive electrode. The conductive polymer layer 7b is first formed on the exposed surface of the anode lead member 4. The conductive polymer layer 7b grows to contact an end of the precoat layer 7a formed on the anode lead member 4. The precoat layer 7a contacting the conductive polymer layer 7b is electrically connected to the anode lead member 4 through the conductive polymer layer 7b. Thereafter, the conductive polymer layer 7b is formed to cover the precoat layer 7a formed on the anode lead member 4 and the anode element 3.

Figure 7:
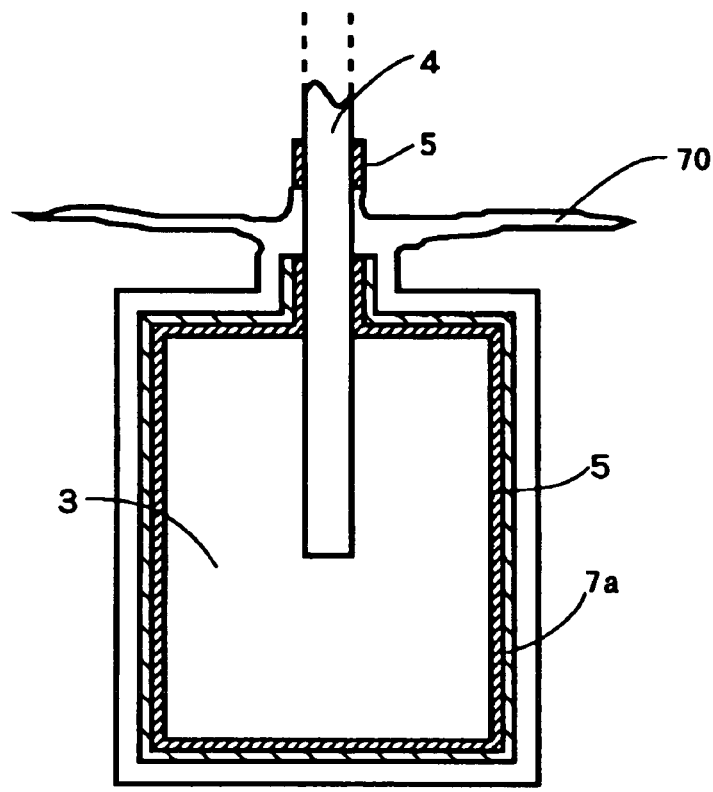
FIG. 7 is a cross-sectional view showing the electrolytic polymerization process for manufacturing the solid electrolytic capacitor of the present invention.

On the other hand, as shown in FIG. 7, the conductive polymer layer 7b grows from the exposed surface of the anode lead member 4 along the surface 40 of the solution to generate a burr 70. The conductive polymer layer 7b is formed also on a part of the anode lead member 4 projecting from the surface 40 of the solution, but unlikely to be formed on the surface of the anode lead member 4 having only the dielectric coating 5 formed thereon. Therefore, where the burr 70 of the conductive polymer layer 7b occurs is limited to the exposed surface of the anode lead member 4.

Figure 8:
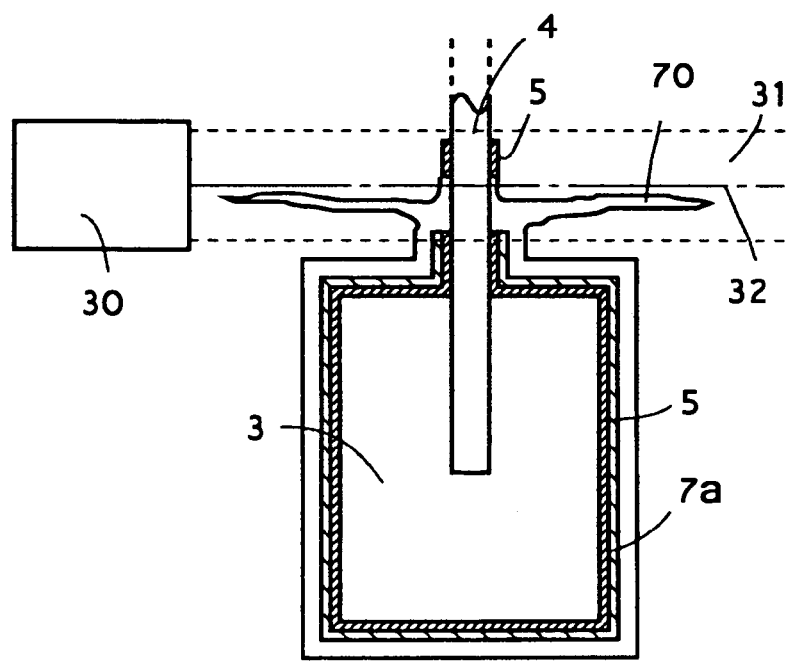
FIG. 8 is a cross-sectional view showing a second removal process for manufacturing the solid electrolytic capacitor of the present invention.

After the electrolytic polymerization process, a second removal process for removing the burr 70 is performed. As shown in FIG. 8, in the second removal process, the laser beam 31 is radiated like in the first removal process from the laser light source 30 to the burr 70 to be removed. Where the burr 70 of the conductive polymer layer 7b occurs is limited to the exposed surface of the anode lead member 4. Therefore, in the second removal process, positioning of the anode lead member 4 relative to the laser light source 30 is performed in the same manner as in the first removal process. The burr 70 can be easily removed by radiating the laser beam 31 to the anode lead member 4. In the second removal process, the burr 70 of the conductive polymer layer 7b is removed together with the dielectric coating 5 formed closer to the leading end of the anode lead member 4 than the burr 70, the dielectric coating 5 formed closer to the anode element 3 than the burr 70, and the solid electrolyte layer 7 formed on the dielectric coating 5 close to the burr 70. Therefore, preferably, a beam diameter and/or an output of the laser beam 31 is greater than a beam diameter and/or an output in the previous first removal process. Alternatively, preferably, an optical axis 32 is moved upwardly and downwardly or in a circular motion on a position of the light source in the first removal process.

Figure 9:
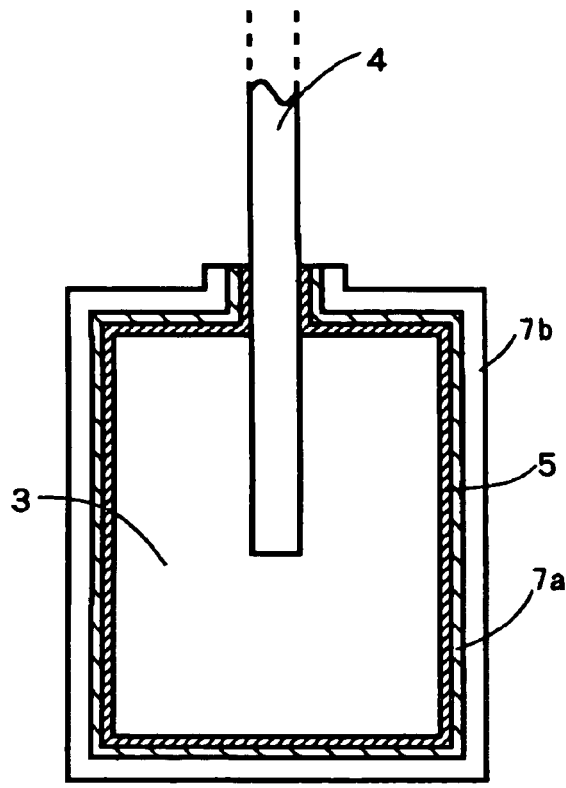
FIG. 9 is a cross-sectional view showing the second removal process for manufacturing the solid electrolytic capacitor of the present invention.

In this way, as shown in FIG. 9, the dielectric coating 5 and the solid electrolyte layer 7 formed on the dielectric coating 5 are left on the anode lead member 4 only near the anode element 3. End faces of the dielectric coating 5 and the solid electrolyte layer 7 on the anode lead member 4 are formed approximately flush with each other. After the second removal process, a washing and drying process for the anode element 3 and the anode lead member 4 is performed. Thereafter performed are a process for forming a carbon layer 8 and further a silver layer 9 on the conductive polymer layer 7b, and a process for adjusting a length of the anode lead member 4. Thereafter, a flat plate-like anode terminal 10 and cathode terminal 11 are connected to the capacitor element 2.

Figure 10:
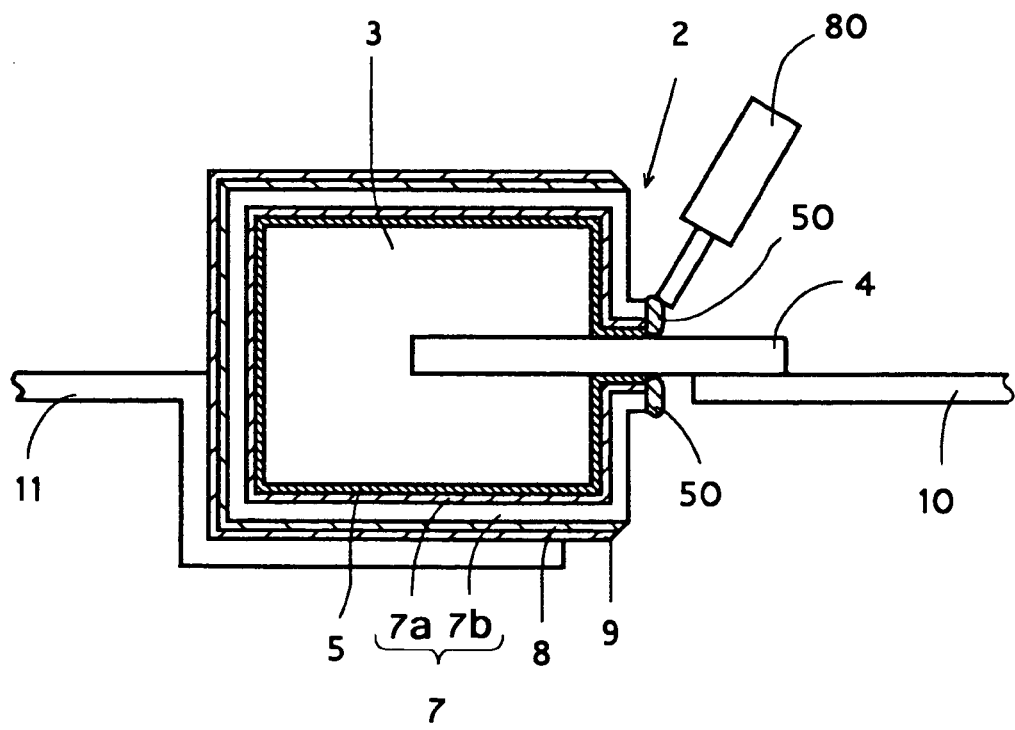
FIG. 10 is a cross-sectional view showing an insulating layer formation process for manufacturing the solid electrolytic capacitor of the present invention.

Next, as shown in FIG. 10, an insulating material to be an insulating layer 50 is applied using a dispenser 80 to the approximately flush formed end faces of the dielectric coating 5 and the solid electrolyte layer 7 on the anode lead member 4 to form the insulating layer 50. When fluoroelastomer is used as a material for the insulating layer 50, most preferably, fluoroelastomer is dissolved for use in a glycol series solvent, for example, propyleneglycol 1-monomethylether 2-acetate to give good wettability with the conductive polymer layer 7b.

Thereafter, the capacitor element 2 is placed in a mold, and a thermosetting synthetic resin such as epoxy resin is injection-molded to form an enclosure member 12. Further, a process for bending the anode terminal 10 and the cathode terminal 11 and an aging process are performed to complete a solid electrolytic capacitor 1 shown in FIG. 1.

EXAMPLE 2

Figure 11:
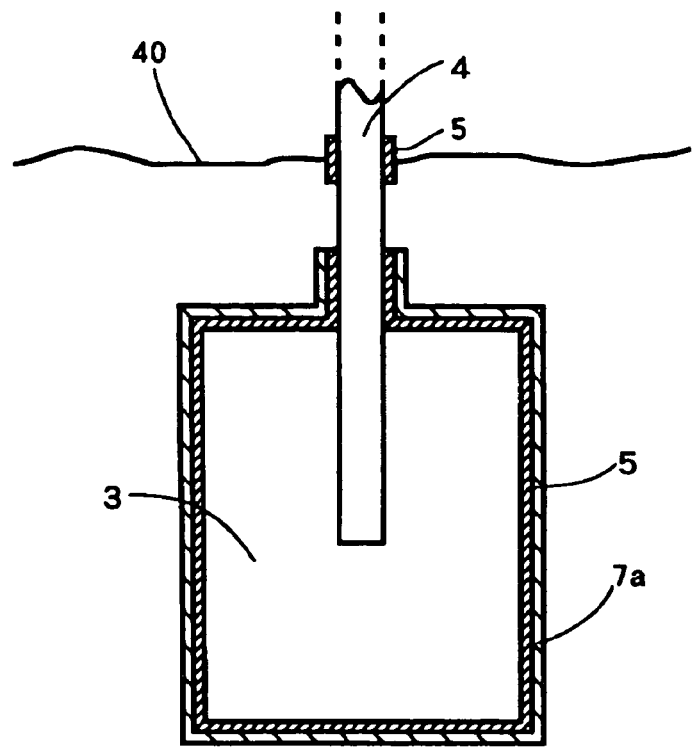
FIG. 11 is a cross-sectional view showing another electrolytic polymerization process for manufacturing the solid electrolytic capacitor of the present invention.

In Example 2, the anodizing process and the chemical polymerization process are performed, and thereafter the first removal process is performed, in the same manner as in Example 1. As shown in FIG. 11, in an electrolytic polymerization process in Example 2 for forming a conductive polymer layer 7b on the precoat layer 7a, the surface of the anode lead member 4 having only the dielectric coating 5 formed thereon is positioned on the surface 40 of the solution. Other respects are the same as in the electrolytic polymerization process in Example 1. The conductive polymer layer 7b is formed on the exposed surface of the anode lead member 4 and on the precoat layer 7a formed on the anode lead member 4 and the anode element 3.

Figure 12:
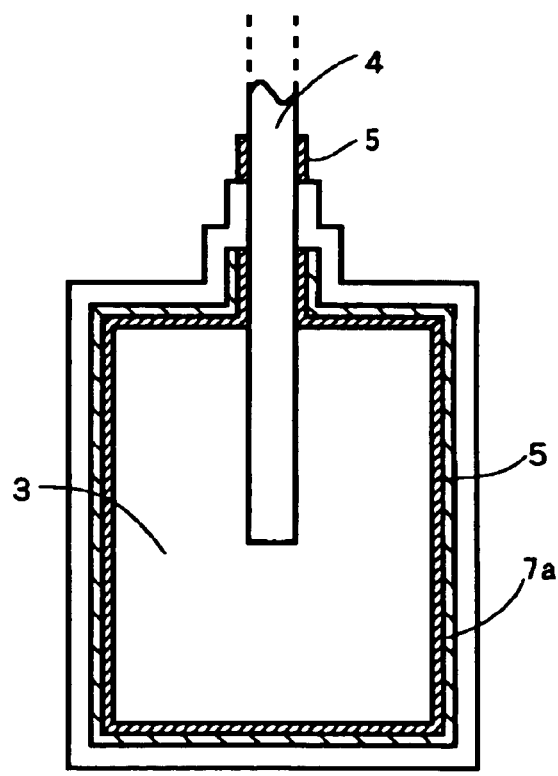
FIG. 12 is a cross-sectional view showing another electrolytic polymerization process for manufacturing the solid electrolytic capacitor of the present invention.

In the electrolytic polymerization process in Example 2, the conductive polymer layer 7b is formed under the surface 40 of the solution. Therefore, as shown in FIG. 12, the burr 70 extending to the sides of the anode lead member 4 as seen in Example 1 is not formed on the conductive polymer layer 7b formed in the electrolytic polymerization process in Example 2. When the burr 70 does not occur on the conductive polymer layer 7b formed in the electrolytic polymerization process, the precoat layer 7a may be formed on the dielectric coating 5 provided at the side of the leading end of the anode lead member 4.

Next, a second removal process is performed in the same manner as in Example 1. By the second removal process, the dielectric coating 5 and the solid electrolyte layer 7 are left on the anode lead member 4 only near the anode element 3. Like in Example 1, end faces of the dielectric coating 5 and the solid electrolyte layer 7 on the anode lead member 4 are formed approximately flush with each other. Processes are the same as in Example 1 after the second removal process until attaching an anode terminal 10 and a cathode terminal 11 to the capacitor element 2.

Figure 13:
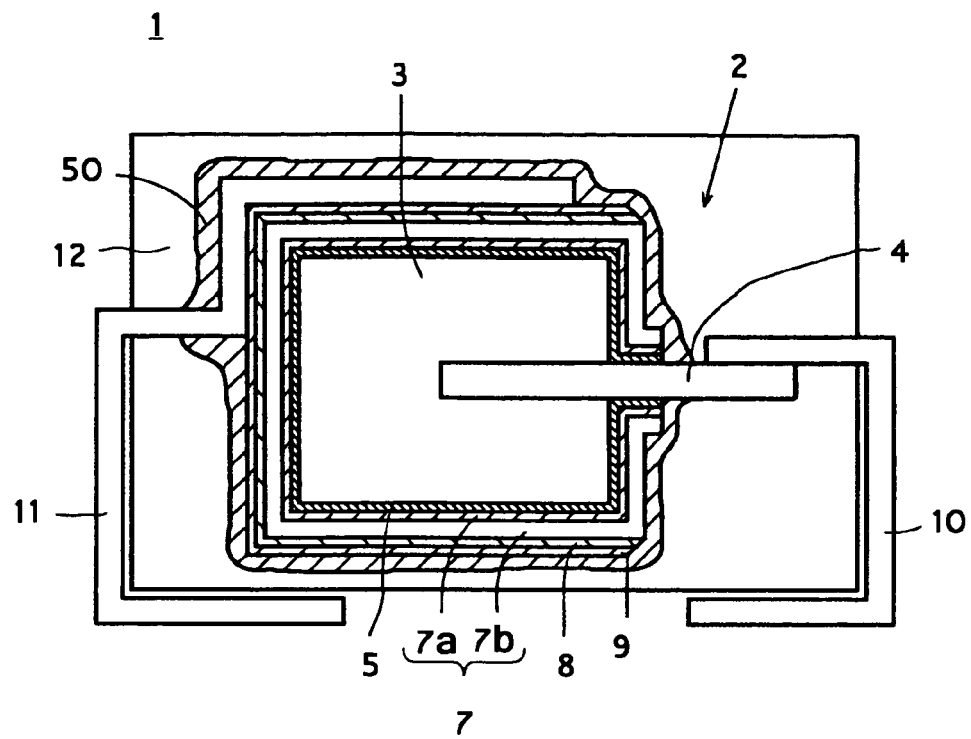
FIG. 13 is a cross-sectional view of another solid electrolytic capacitor of the present invention.
Figure 14:
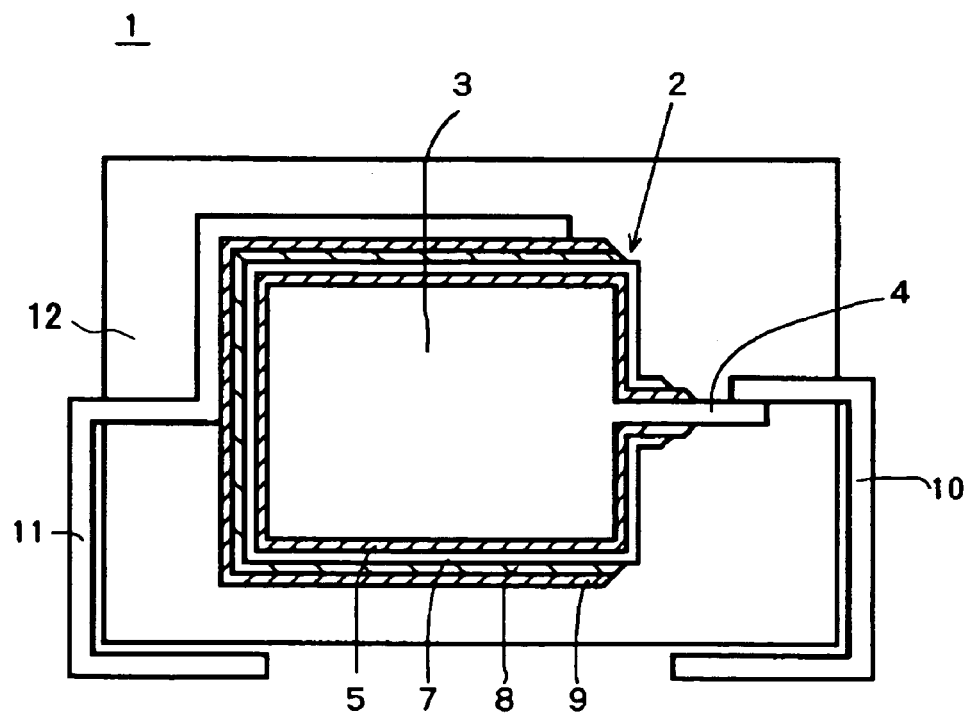
FIG. 14 is a cross-sectional view of a conventional solid electrolytic capacitor.
Figure 15:
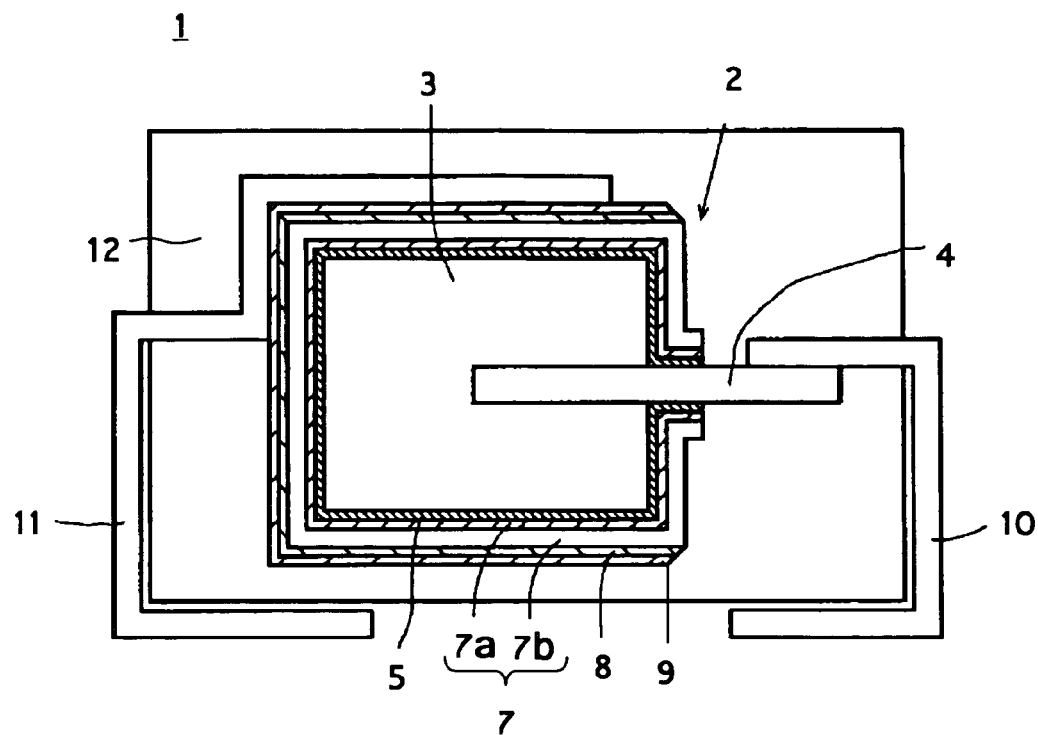
FIG. 15 is a cross-sectional view of another conventional solid electrolytic capacitor.
Figure 16:
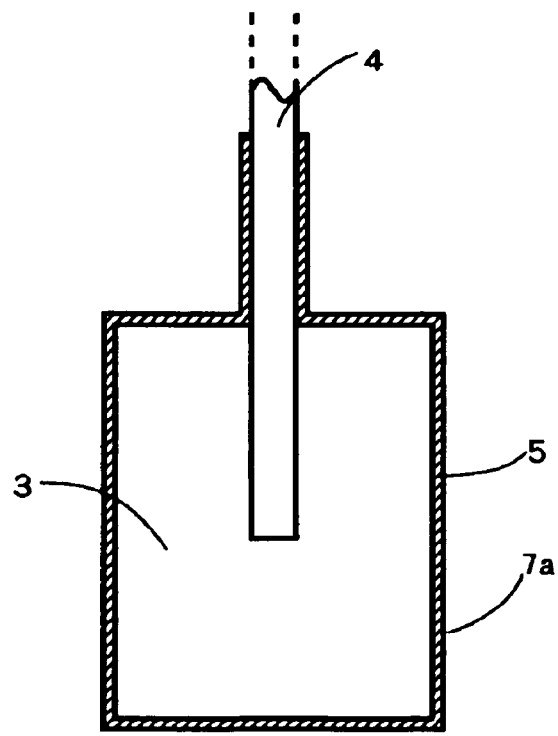
FIG. 16 is a cross-sectional view illustrating a manufacturing method for a conventional capacitor element.
Figure 17:
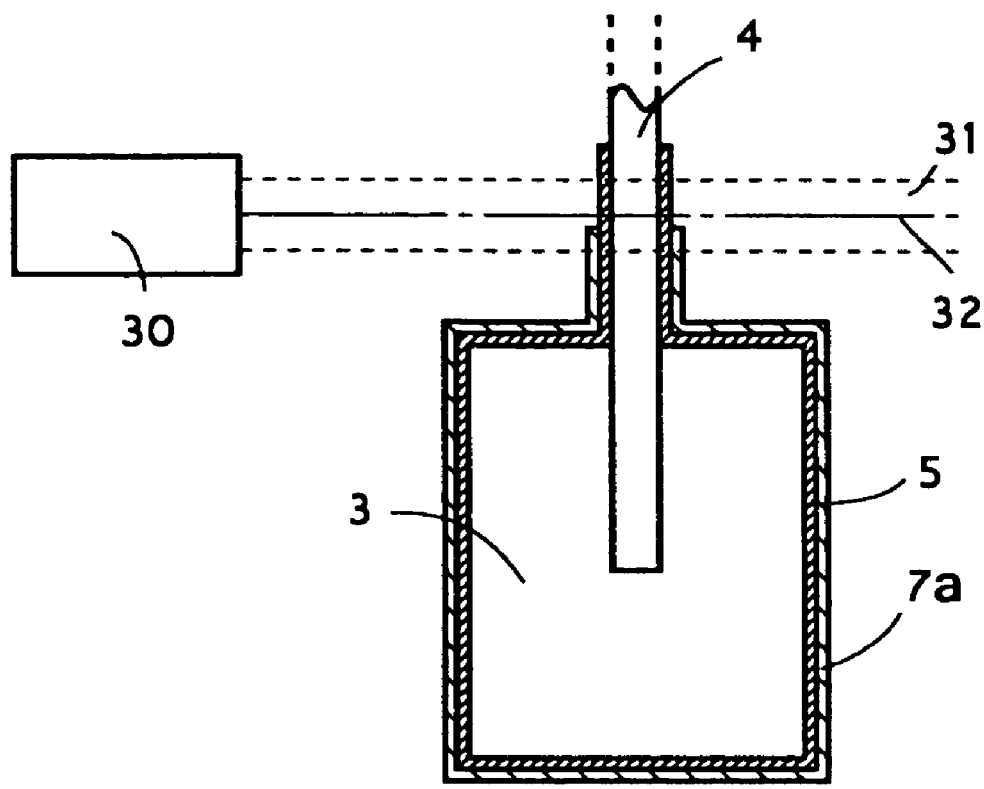
FIG. 17 is a cross-sectional view illustrating the manufacturing method for the conventional capacitor element.

Thereafter, an insulating material to be an insulating layer 50 is sprayed on the entire outer periphery of the capacitor element 2. The end faces of the dielectric coating 5 and the solid electrolyte layer 7 on the anode lead member 4 are covered with the insulating layer 50. Fluoroelastomer is used as a material constituting the insulating layer 50 like in Example 1. Thereafter, a process for forming an enclosure member 12, a process for bending the terminals 10, 11, and an aging process are performed in the same manner as in Example 1. In this way, a solid electrolytic capacitor 1 shown in FIG. 13 is completed.

COMPARATIVE EXAMPLE

A solid electrolytic capacitor of a comparative example is the same as those in above Examples except that it lacks the insulating layer 50 covering the end faces of the dielectric coating 5 on the anode lead member 4 and the solid electrolyte layer 7 formed on the dielectric coating 5, and was manufactured using the same method as in Example 1.

A high-temperature load test was done on the solid electrolytic capacitors formed with the methods of Examples 1 and 2 and the capacitor of the comparative example. In the high-temperature load test, two environmental conditions were set. One environmental condition was a temperature of 60° C. and a humidity of 90%, while the other environmental condition was a temperature of 85° C. and a humidity of 85%. Under the two environmental conditions, each was checked for leak current failure and short circuit failure after 1000 hours and after 2000 hours.

Table 1 shows the result. Each experiment used 50 samples for each of the examples.

TABLE 1

| | 60° C. & 90% High-temp. Load Test | | 85° C. & 85% High-temp. Load Test | |
|---|---|---|---|---|
| | After 1000 hrs | After 2000 hrs | After 1000 hrs | After 2000 hrs |
| Example 1 | No Failure | No Failure | No Failure | No Failure |
| Example 2 | No Failure | No Failure | No Failure | No Failure |
| Comp. Ex. | LC Failure 2 | LC Failure 2 Short Circuit Failure 1 | LC Failure 3 | LC Failure 5 Short Circuit Failure 2 |

As seen in Table 1, leak current failure (LC failure) and short circuit failure occurred in the comparative example, while neither leak current failure (LC failure) nor short circuit failure occurred in Example 1 and Example 2. Here, the leak current failure means that the magnitude of a leak current at five minutes after rated voltage application exceeds a predetermined value (0.1×C (capacitance of the solid electrolytic capacitor)×V (applied voltage)).

In Example 1 and Example 2, when heat is applied during the injection molding process or aging process, the insulating layer 50 turns soft because of the heat, so that the insulating layer 50 is easily deformed along the end faces of the solid electrolyte layer 7 and the dielectric coating 5. Therefore, a gap is unlikely to occur between the end faces of the solid electrolyte layer 7 and the dielectric coating 5 and the insulating layer 50. Further, a difference between a coefficient of thermal expansion of the solid electrolyte layer 7 and the dielectric coating 5 and a coefficient of thermal expansion of the insulating layer 50 is smaller than a difference between the coefficient of thermal expansion of the solid electrolyte layer 7 and the dielectric coating 5 and a coefficient of thermal expansion of the enclosure member 12. Therefore, in Example 1 and Example 2, when heat is applied during the injection molding process or aging process, a gap caused by a difference between coefficients of thermal expansion is more unlikely to occur between the end faces of the solid electrolyte layer 7 and the dielectric coating 5 and the insulating layer 50 than in the comparative example in which end faces of the solid electrolyte layer 7 and the dielectric coating 5 are directly covered with the enclosure member 12. Thus, the strengthened end faces of the solid electrolyte layer 7 and the dielectric coating 5 covered with the insulating layer 50 reduce crack occurrence due to external stress or time degradation, and therefore can prevent leak current failure and short circuit failure.

Even if a gap exists between the enclosure member 12 and the anode lead member 4, and, under high humidity environment, external moisture enters an inside of the enclosure member 12 through the gap from an interface between the anode terminal 10 and the enclosure member 12, then, in Example 1 and Example 2, the end faces of the dielectric coating 5 and the solid electrolyte layer 7 covered with the insulating layer 50 do not acquire the moisture. This can prevent leak current failure and short circuit failure. Preferably, a fluorine series resin with good water repellency is used as the insulating layer 50 against such leak current failure and short circuit failure due to moisture. During injection molding, the solid electrolyte layer 7 and the dielectric coating 5 can be protected from injection pressure because the end faces of the solid electrolyte layer 7 and the dielectric coating 5 are covered with the insulating layer 50. Therefore, the solid electrolyte layer 7 and the dielectric coating 5 are unlikely to be damaged during injection molding, so that an increase of a leak current due to cracks of the solid electrolyte layer 7 and the dielectric coating 5 can be suppressed. Although a distance between the solid electrolyte layer 7 and the anode lead member 4 is very narrow because the end face of the dielectric coating 5 and the end face of the solid electrolyte layer 7 are formed flush with each other, a leak current can be suppressed in Example 1 and Example 2 by covering the end face of the dielectric coating 5 and the end face of the solid electrolyte layer 7 with the insulating layer 50. It has been recognized that the above-described effect can be obtained if the insulating layer 50 has a thickness of 20 μm or more. Furthermore, a capacitance enhancing effect, though slight, can be obtained because the end faces of the dielectric coating 5 and the solid electrolyte layer 7 are formed flush with each other.

A method for forming the end faces of the dielectric coating 5 and the solid electrolyte layer 7 on the anode lead member 4 flush with each other is not limited to the method using the laser beam 31, and a mechanical separation method or the like may be used. The laser beam 31 is used in the first and second removal processes in Example 1 and Example 2, but the laser beam 31 may be used only in the second removal process. A thermoplastic fluorine series resin of fluoroelastomer is used as the insulating layer 50 in Examples, but a thermosetting resin such as epoxy resin would be effective if it has a coefficient of thermal expansion smaller than that of the enclosure member 12. An experiment of the applicants has confirmed that leak current failure and short circuit failure are suppressed also in the case where epoxy resin is used as the insulating layer 50 with a coefficient of thermal expansion adjusted to 3.8/° C. by an additive agent when the enclosure member 12 is made of epoxy resin with a coefficient of thermal expansion of 4.5/° C.

The present invention is not limited to the foregoing embodiment but can be modified variously by one skilled in the art without departing from the spirit of the invention as set forth in the appended claims.

What is claimed is:

1. A solid electrolytic capacitor comprising a capacitor element having an anode element, an anode lead member projecting from one end face of the anode element, a dielectric coating formed in one piece on a surface of the anode element and a surface of the anode lead member near the anode element, a solid electrolyte layer formed on the dielectric coating, and a cathode lead layer formed on the solid electrolyte layer formed on the anode element; an anode terminal connected to the anode lead member; a cathode terminal connected to the cathode lead layer; and an insulating enclosure member for coating the outer periphery of the capacitor element, wherein end faces of the dielectric coating and the solid electrolyte layer formed on the anode lead member are formed approximately flush with each other, and covered with an insulating layer made of a thermoplastic insulating material.

2. The solid electrolytic capacitor according to claim 1, wherein the enclosure member is made of a thermosetting material.

3. The solid electrolytic capacitor according to claim 1, wherein the insulating layer is made of a fluorine series resin.

4. A solid electrolytic capacitor comprising a capacitor element having an anode element, an anode lead member projecting from one end face of the anode element, a dielectric coating formed in one piece on a surface of the anode element and a surface of the anode lead member near the anode element, a solid electrolyte layer formed on the dielectric coating, and a cathode lead layer formed on the solid electrolyte layer formed on the anode element; an anode terminal connected to the anode lead member; a cathode terminal connected to the cathode lead layer; and an insulating enclosure member for coating the outer periphery of the capacitor element, wherein end faces of the dielectric coating and the solid electrolyte layer formed on the anode lead member are formed approximately flush with each other, and covered with an insulating layer made of an insulating material with a coefficient of thermal expansion smaller than that of the enclosure member.

5. The solid electrolytic capacitor according to claim 4, wherein the insulating layer is made of a thermoplastic material.

6. The solid electrolytic capacitor according to claim 5, wherein the enclosure member is made of a thermosetting material.

7. The solid electrolytic capacitor according to claim 5, wherein the insulating layer is made of a fluorine series resin.

8. A manufacturing method for a solid electrolytic capacitor comprising:
   a first step of forming a one-piece dielectric coating on a surface of an anode element and a surface of an anode lead member projecting from the anode element;
   a second step of forming a precoat layer on the dielectric coating;
   a third step of partially removing the dielectric coating and the precoat layer on the anode lead member to expose the surface of the anode lead member at the side of the anode element, while keeping the dielectric coating and the precoat layer on the anode lead member near the anode element;
   a fourth step of dipping the anode element and the anode lead member in a solution having a monomer dissolved therein, and, with the exposed surface of the anode lead member positioned on the surface of the solution, forming a conductive polymer layer on the precoat layer using an electrolytic polymerization method to form a solid electrolyte layer including the precoat layer and the conductive polymer layer;
   a fifth step of removing a burr of the conductive polymer layer generated on the exposed surface of the anode lead member;
   a sixth step of forming a cathode lead layer on the conductive polymer layer to form a capacitor element; and
   a seventh step of coating the outer periphery of the capacitor element with an enclosure member by injection molding,
   wherein after the fifth step and before the seventh step, at least end faces of the dielectric coating and the solid electrolyte layer formed on the anode lead member near the anode element are covered with an insulating layer made of a thermoplastic insulating material.

9. The manufacturing method for a solid electrolytic capacitor according to claim 8, wherein in the fifth step, the burr of the conductive polymer layer is removed by a laser beam.

10. A manufacturing method for a solid electrolytic capacitor comprising:
    a first step of forming a one-piece dielectric coating on a surface of an anode element and a surface of an anode lead member projecting from the anode element;
    a second step of forming a precoat layer on the dielectric coating;
    a third step of partially removing the dielectric coating and the precoat layer on the anode lead member to expose the surface of the anode lead member at the side of the anode element, while keeping the dielectric coating and the precoat layer on the anode lead member near the anode element, and keeping the dielectric coating at the side of the leading end of the anode lead member;
    a fourth step of dipping the anode element and the anode lead member in a solution having a monomer dissolved therein, and, with the dielectric coating formed at the side of the leading end of the anode lead member positioned on the surface of the solution, forming a conductive polymer layer on the precoat layer using an electrolytic polymerization method to form a solid electrolyte layer including the precoat layer and the conductive polymer layer;
    a fifth step of removing the conductive polymer layer formed on the exposed surface of the anode lead member;
    a sixth step of forming a cathode lead layer on the conductive polymer layer to form a capacitor element; and
    a seventh step of coating the outer periphery of the capacitor element with an enclosure member by injection molding,
    wherein after the fifth step and before the seventh step, at least end faces of the dielectric coating and the solid electrolyte layer formed on the anode lead member near the anode element are covered with an insulating layer made of a thermoplastic insulating material.

11. The manufacturing method for a solid electrolytic capacitor according to claim 10, wherein in the fifth step, the conductive polymer layer formed on the exposed surface of the anode lead member is removed by a laser beam.

12. The manufacturing method for a solid electrolytic capacitor according to claim 10, wherein in the third step, only the dielectric coating formed on the surface of the anode lead member is left at the side of the leading end of the anode lead member.

13. A manufacturing method for a solid electrolytic capacitor comprising:
    a first step of forming a one-piece dielectric coating on a surface of an anode element and a surface of an anode lead member projecting from the anode element;
    a second step of forming a precoat layer on the dielectric coating;
    a third step of partially removing the dielectric coating and the precoat layer on the anode lead member to expose the surface of the anode lead member at the side of the anode element, while keeping the dielectric coating and the precoat layer on the anode lead member near the anode element;
    a fourth step of dipping the anode element and the anode lead member in a solution having a monomer dissolved therein, and, with the exposed surface of the anode lead member positioned on the surface of the solution, forming a conductive polymer layer on the precoat layer using an electrolytic polymerization method to form a solid electrolyte layer including the precoat layer and the conductive polymer layer;
    a fifth step of removing a burr of the conductive polymer layer generated on the exposed surface of the anode lead member;
    a sixth step of forming a cathode lead layer on the conductive polymer layer to form a capacitor element; and
    a seventh step of coating the outer periphery of the capacitor element with an enclosure member by injection molding,
    wherein after the fifth step and before the seventh step, at least end faces of the dielectric coating and the solid electrolyte layer formed on the anode lead member near the anode element are covered with an insulating layer made of an insulating material with a coefficient of thermal expansion smaller than a coefficient of thermal expansion of the enclosure member.

14. The manufacturing method for a solid electrolytic capacitor according to claim 13, wherein in the fifth step, the burr of the conductive polymer layer is removed by a laser beam.

15. A manufacturing method for a solid electrolytic capacitor comprising:
- a first step of forming a one-piece dielectric coating on a surface of an anode element and a surface of an anode lead member projecting from the anode element;
- a second step of forming a precoat layer on the dielectric coating;
- a third step of partially removing the dielectric coating and the precoat layer on the anode lead member to expose the surface of the anode lead member at the side of the anode element, while keeping the dielectric coating and the precoat layer on the anode lead member near the anode element, and keeping the dielectric coating at the side of the leading end of the anode lead member;
- a fourth step of dipping the anode element and the anode lead member in a solution having a monomer dissolved therein, and, with the dielectric coating formed at the side of the leading end of the anode lead member positioned on the surface of the solution, forming a conductive polymer layer on the precoat layer using an electrolytic polymerization method to form a solid electrolyte layer including the precoat layer and the conductive polymer layer;
- a fifth step of removing the conductive polymer layer formed on the exposed surface of the anode lead member;
- a sixth step of forming a cathode lead layer on the conductive polymer layer to form a capacitor element; and
- a seventh step of coating the outer periphery of the capacitor element with an enclosure member by injection molding, wherein after the fifth step and before the seventh step, at least end faces of the dielectric coating and the solid electrolyte layer formed on the anode lead member near the anode element are covered with an insulating layer made of an insulating material with a coefficient of thermal expansion smaller than a coefficient of thermal expansion of the enclosure member.

16. The manufacturing method for a solid electrolytic capacitor according to claim 15, wherein the conductive polymer layer formed on the exposed surface of the anode lead member is removed by a laser beam.

17. The manufacturing method for a solid electrolytic capacitor according to claim 15, wherein in the third step, only the dielectric coating formed at the side of the leading end of the anode lead member is left.

* * * * *